April 18, 1939.  D. F. WARNER  2,155,247

GOVERNING MECHANISM

Filed May 19, 1937

Inventor:
Donald F. Warner,
by Harry E. Dunham
His Attorney.

Patented Apr. 18, 1939

2,155,247

UNITED STATES PATENT OFFICE 2,155,247

GOVERNING MECHANISM

Donald F. Warner, Swampscott, Mass., assignor to General Electric Company, a corporation of New York Application May 19, 1937, Serial No. 143,525

1 Claim. (Cl. 264—14)

The present invention relates to governing mechanism of the type in which the apparatus to be governed is controlled by variations in the pressure of a fluid pressure system, such pressure being regulated in turn in accordance with the speed of a controlling apparatus.

It is an object of the invention to provide a governing mechanism which will continue to operate reliably even after a long period of use. It is a further and more particular object to provide in connection with a governor of the above-specified type a fluid pressure controlling means which is constructed to avoid deposits of sediment or the occurrence of other cumulative conditions tending to prevent its normal operation.

In accordance with one aspect of the invention the foregoing objects are accomplished by providing a fluid pressure controlling mechanism having a variable outlet through which the operating fluid is discharged centrifugally, such discharge serving to maintain the operative parts of the controlling mechanism continually flushed and free of solid particles.

Figure 1:
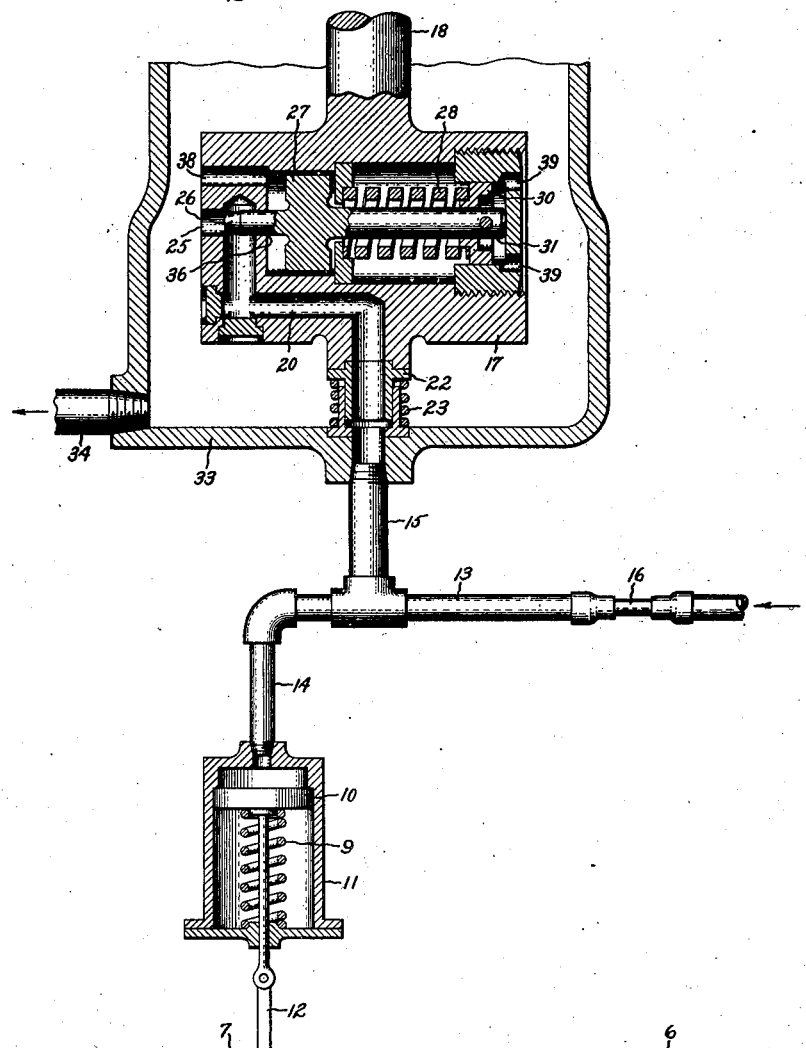
Figure 2:
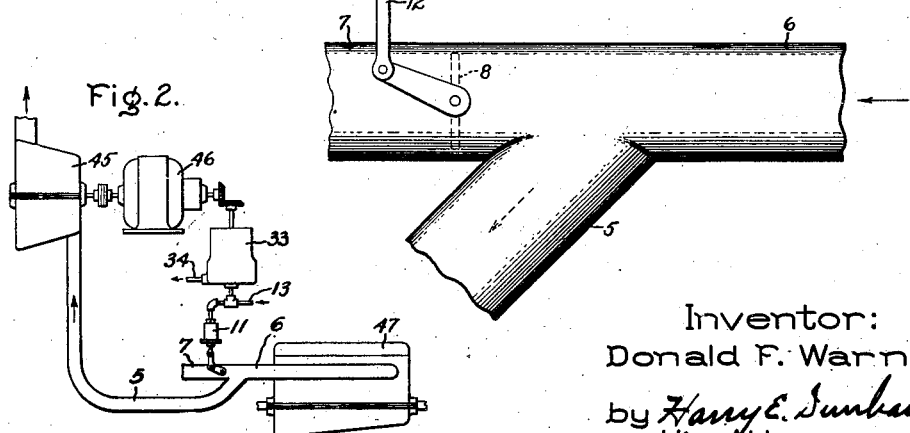

The features of novelty which I desire to protect herein will be pointed out with particularity in the appended claim. The invention itself, together with further objects and advantages thereof, may best be understood by reference to the following description taken in connection with the drawing in which Fig. 1 represents diagrammatically a governing mechanism embodying my invention and Fig. 2 shows one application of such mechanism in connection with power apparatus.

I have illustrated my invention in connection with a governing mechanism particularly useful where the apparatus to be governed is driven by an elastic fluid, although the invention is not limited to such use. In this case the governed apparatus (not shown) may comprise, for example, a rotary gas turbine connected to the outlet end of a fluid conduit 5. This conduit in turn communicates with a supply line pipe 6, which may be connected, for example, with the exhaust of a combustion engine, such as an aeroplane engine. In order to regulate the supply of elastic fluid to the governing apparatus and thereby to control its operation, means is provided for diverting various amounts of the fluid through an exhaust connection 7. Such means as illustrated comprises a valve 8, the position of which is variable in accordance with variations in the operation of the controlling apparatus in a manner to be more fully described in the following.

In order to vary the position of the valve 8 and thereby to control the operation of the apparatus to be governed, there is provided a motor element comprising a piston 10 operating within a closed cylinder 11. This piston operates through a linkage 12 to open and close the valve 8 as it moves from one position to another. A spring 9 serves to bias the piston toward the position in which the valve is completely closed.

In the arrangement contemplated by the present invention the position of the piston 10 is controlled by variations in the pressure of a fluid pressure system. Means for accomplishing such control may comprise, for example, a conduit 13 communicating with a pump (not shown), or with other apparatus for delivering an operating fluid, preferably oil under pressure. A restricting orifice 16 may be included in the conduit 13 for preventing small transitory variations in the supply pressure from affecting the operation of the governing mechanism. The upper surface of the piston 10 is in communication with the fluid conduit 13 through a pipe 14 so that the piston is caused to move up or down against the biasing action of the spring 9 as the pressure in the pipe 14 decreases or increases.

In order to obtain the desired governing action the fluid pressure within the conduit 13 is in turn controlled in accordance with variations in the speed of a controlling apparatus. Such apparatus may be either the machine which is to be governed or an entirely separate machine, depending on the circumstances of use.

In accordance with the present invention the presure controlling means includes a discharge outlet for the fluid conduit 13 which outlet is variable in accordance with the speed of the controlling apparatus. In the arrangement illustrated such an outlet is provided in connection with a rotatable body 17 adapted to be driven by the controlling apparatus through a shaft 18 (shown partly broken away). Within this body there is formed a discharge passage 20 providing during the operation of the mechanism a centrifugal discharge for the pressure system. The passage is preferably of radially extending character, by which term I intend to designate broadly a passage whose inlet is at or adjacent the axis of rotation of the rotating body and whose outlet is at the surface of the body. Thus, the passage 20 shown in the drawing is a radially extending passage within the meaning of the foregoing definition.

The inlet end of the passage 20 is in communication with the fluid conduit 13 through a pipe 15 and a sealed rotatable joint comprising a movable sleeve 22 pressed into tight-fitting engagement with an abutting surface of the rotating body by means of a spring 23. The outlet or discharge end of the passage is at 25 and is adapted to be regulated by means of a valve 26 which is movable by centrifugal forces developed during the rotation of the body 17. This valve is connected with a centrifugal element 27 which is effective to move the valve in an outward direction to close the outlet 25 when the speed of rotation of the shaft 18 exceeds a predetermined value. The distance of such outward movement is determined directly by such speed of rotation and by a biasing spring 28 which is arranged to oppose the action of the centrifugal element. This spring acts on a follower 30 which connects with the centrifugal element and with the valve through a shaft 31. The normal tendency of the spring is to maintain the valve in open position.

As the speed of the controlling apparatus and, consequently, of the rotating body 17 increases above a critical value the valve 26 moves outwardly to vary the degree of closure of the discharge outlet 25. Since the pressure within the conduit 13 is in turn determined by the degree of closure of the outlet 25, it will be seen that this pressure is variable in direct relation with the speed of rotation of the controlling apparatus. Through the reaction of the fluid pressure on the piston 10 the apparatus to be governed is consequently regulated in the desired manner.

The construction of the fluid pressure governing means which I have described in the foregoing is such that the solid particles of foreign material are prevented from depositing within the controlling means and impairing its operation. Due to the centrifugal discharge afforded by the radially extending discharge passage such foreign particles or sediment as may exist in the oil or other fluid employed will be positively forced outwardly through the passage and the opening 25 and will have no opportunity to cause sticking or binding of the governing means.

The fluid which issues from the opening 25 is received in an outer casing 33 which surrounds the rotating body 17. From here it may be drawn off to a sump or other point of collection through an outlet pipe 34.

During operation of the apparatus a certain amount of the oil or other operating fluid is bound to leak past the valve shaft at the region 36 and become collected within the rotating body. To permit this collected fluid to escape into the casing 33, ports 38 and 39 are provided in the structure of the body. The continuous flow of leakage fluid through these ports serves to maintain the various moving parts of the valve regulating mechanism well lubricated and in good running order.

In Fig. 2 the governing mechanism described in the foregoing is shown as applied to the regulation of an exhaust gas turbine 45 which serves as prime mover for a generator 46. The source of driving fluid for the turbine 45 is illustrated as comprising an internal combustion engine 47 having an exhaust pipe 6 corresponding to the pipe 6 of Fig. 1. This pipe connects with the turbine through a conduit 5 and with a valve-controlled venting outlet 7. The outlet is under the control of a governing mechanism comprising a fluid motor 11, a fluid pressure system including an inlet 13 and an outlet 34 and a pressure controlling device 33 of the type hereinbefore described.

Since the controlling device 33 is connected to the generator 46, its operation is directly responsive to the turbine speed. Consequently, if the turbine speed tends to increase, the rate of discharge from the fluid outlet 34 is decreased, the pressure of the system rises, and the valve controlling the venting outlet 7 is opened to an increased extent. The ultimate effect is to decrease the supply of driving fluid to the turbine 45 and to lessen its speed correspondingly. Obviously, the converse governing action occurs if the turbine speed tends to rise.

While I have shown a particular embodiment of my invention, it will be understood by those skilled in the art that many modifications may be made without departing from the invention, and I aim by the appended claim to cover all such modifications as fall within the true spirit and scope of the foregoing disclosure.

What I claim as new and desire to secure by Letters Patent of the United States is:

A governing mechanism comprising a conduit, means for delivering liquid under pressure to the conduit, a motor operable in accordance with variations in pressure in the conduit for controlling an apparatus to be governed, a rotatable body to be driven by a controlling apparatus and having a radially extending discharge passage therein, said passage having an inlet adjacent the axis of rotation of the body and an outwardly directed discharge opening at the exterior surface of the body whereby the flow of liquid through the body is substantially continuously outward, and a valve element arranged within the interior of the body and rotatable therewith, said element being movable outwardly by centrifugal force developed during the rotation of the body to close the discharge opening and thereby to regulate the flow through the passage in accordance with variations in the speed of the controlling apparatus.

DONALD F. WARNER.